United States Patent [19]

Fukuda et al.

[11] Patent Number: 4,469,610

[45] Date of Patent: Sep. 4, 1984

[54] ELECTROLYTE FOR AN ELECTROLYTIC CAPACITOR

[75] Inventors: Katsuaki Fukuda; Takato Ito, both of Tokyo, Japan

[73] Assignee: Nippon Chemi-Con Corporation, Tokyo, Japan

[21] Appl. No.: 514,897

[22] Filed: Jul. 18, 1983

[51] Int. Cl.$^3$ .............................................. H01G 9/02
[52] U.S. Cl. .................................... 252/62.2; 361/433
[58] Field of Search ........................................ 252/62.2

[56] References Cited

U.S. PATENT DOCUMENTS 4,110,817  8/1978  Ross et al. ........................... 252/62.2
4,164,779  8/1979  Lauer et al. ......................... 252/62.2
4,373,177  2/1983  Finkelstein ......................... 252/62.2
4,377,692  3/1983  Barry et al. ......................... 252/62.2

FOREIGN PATENT DOCUMENTS 2041646  9/1980  United Kingdom .............. 252/62.2

Primary Examiner—Arthur P. Demers
Attorney, Agent, or Firm—Sughrue, Mion, Zinn, Macpeak, and Seas

[57] ABSTRACT

An electrolyte for an electrolytic capacitor which comprises using as a main solute(s) at least one of a long chain dibasic acid having 12 to 22 carbon atoms and containing an alkyl group at the side chain thereof or a salt thereof and dissolving said solute(s) in a solvent mainly composed of ethylene glycol, and adding and dissolving at least one compound selected from the group consisting of a polycarboxylic acid, an inorganic acid consisting of phosphoric acid and sulfuric acid, 8-oxyquinoline and ethylenediamine tetraacetic acid (or a salt thereof) to and in the resulting solution.

4 Claims, No Drawings

ELECTROLYTE FOR AN ELECTROLYTIC CAPACITOR

FIELD OF THE INVENTION

The present invention relates to an electrolyte for an electrolytic capacitor, and more particularly to an electrolyte which can reduce internal resistance of an electrolytic capacitor and broaden the temperature range over which the capacitor can be used.

BACKGROUND OF THE INVENTION

In general, electrolytic capacitors are prepared by immersing with an electrolyte and electrolytic capacitors element comprising separating paper located between electrode foils at a cathode and an anode, and then sealing in an armoring case. As is well known, an aluminum foil or the like which has undergone an etching treatment is employed as the electrode foils; as the electrode foil at the anode, the etching-treated foil followed by formation of an oxidized layer of dielectrics is employed. In such electrolytic capacitors, an electrolyte in which electrolytic capacitor elements are immersed is a main constituent of electrolytic capacitors, together with electrode foils, separating paper, armoring cases and sealing members, etc. The chemical or electric properties of an electrolyte become factors which determine the electric properties and life properties of the electrolytic capacitors.

Electrolytes used for medium and high voltage electrolytic capacitors having a rated voltage of more than 160 V are a so called ethylene glycol-boric acid type electrolyte containing boric acid or an ammonium salt thereof in a solvent mainly composed of ethylene glycol (refer to U.S. Pat. No. 3,812,039). It is known that the electrolyte of this type increases an equivalent series resistance of an electrolytic capacitor and at the same time, increases its loss, due to markedly high specific resistance as compared to that of an electrolyte for low voltage electrolytic capacitors. Further, the electrolyte of this type also contains large amounts of water formed during esterification of ethylene glycol and boric acid, in addition to water inherently contained in chemicals constituting the electrolyte. These waters seriously deteriorate an oxidized layer of a dielectric formed at the surface of electrode foil at the anode so that electric properties of the electrolytic capacitor are rendered unstable. This results in reduction of the life of the capacitor. In addition, electrolytic capacitors are accompanied by the generation of heat once the ripple current is turned on, according to the amount of the ripple current and the internal resistance. Depending upon condition for use, the temperatures of electrolytic capacitors can become higher than 100° C. The water contained in electrolyte forms large amounts of water vapor at temperatures exceeding 100° C. which abnormally increases the inner pressure of an armoring case. This can cause distortion in the appearance of the armoring case and deteriorate the electric properties. For these reasons, it is impossible to use the electrolyte of this type at temperatures over 105° C. Accordingly, the upper limit for temperatures at which conventional electrolytic capacitors are employed is restricted.

Electrolytic capacitors are used in a variety of different types of electronic equipment, such as communication equipment and measuring equipment. As is well known, electric properties of electrolytic capacitors play a large part in the efficiencies of these electronic equipments. In order to render these electronic equipments compact and highly efficient, electrolytic capacitors having long life, excellent electric properties and high reliance have been desired. Particularly in stable electric sources, switching regulators having a high switching frequency are employed based on requirements such rendering equipments compact. Smoothing capacitors employed for an electric source of this type must have low impedance characteristics to a high frequency and at the same time, have a high upper temperature-limitation.

To comply with such a requirement, an electrolyte using a long chain dibasic acid having an alkyl group at the side chain thereof has been proposed in Japanese patent application (OPI) No. 27013/82. Such an electrolyte is used to reduce the specific resistivity affecting impedance characteristics of electrolytic capacitors and broaden the temperature range, particularly to increase the upper temperature limit under which the capacitor can be used. That is, the electrolyte obtained by dissolving a long chain dibasic acid having an alkyl group substituent in a solvent mainly composed of ethylene glycol exhibits an extremely small specific resistance as compared to ethylene glycol-boric acid type electrolytes and can markedly reduce an equivalent series resistance and its loss of the electrolytic capacitor. Further, in the case of conventional ethylene glycol-boric acid type electrolytes, esterification easily proceeds to release 3 mols of water which is obtained by a condensation reaction from 1 mol of boric acid. Accordingly, the water content in the electrolytes becomes extremely large. However, with electrolytes containing long chain dibasic acids therein, the water content becomes extremely small since the amount of a solute is smaller than that of conventional electrolytes and the water obtained by condensation reaction is produced in an extremely small amount due to the larger molecular weight of the long chain dibasic acids as compared to the molecular weight of boric acid. For this reason, deterioration of an oxidized layer of a dielectric which is formed at the surface of the electrode foil at anode can be prevented.

However, with electrolytes of this kind, there is a tendency when using an etched aluminum foil as a cathode that electric capacity might be decreased due to high facility of forming a complex of the long chain dibasic acid to aluminum. That is an aluminum foil which has undergone an etching treatment is employed as the electrode foil at the cathode. When the long chain dibasic acid is brought into contact with this aluminum foil, a complex is formed at the surface thereof. The etching treatment to an electrode foil leads to forming fine etching pits at the surface and interior of the electrode foil to enlarge an effective surface area of the electrode foil. The complex thus formed is formed such that it shortens the etching pits and acts to reduce the effective surface area of the electrode foil at the cathode. It is thus believed that the decrease in electric capacity would be due to such reduction of the effective surface area. In addition, such a complex is formed in the presence of a slight amount of water, for example, water brought during the assembly line of products. Therefore, the electric capacity of the electrolytic capacitor is reduced even during life test.

SUMMARY OF THE INVENTION

A primary object of the present invention is to provide an electrolyte for an electrolytic capacitor, said electrolyte having improved properties.

Another object of the invention is to provide such electrolyte which has a small specific resistance.

Yet another object of the invention is to provide such an electrolyte which has a reduced water content.

Still another object of the invention is to provide such an electrolyte which has the above improved properties without damaging the other desirable characteristics of the electrolyte.

Another object of the invention is to provide such an electrolyte using a long chain dibasic acid as a solute.

Yet another object of the invention is to provide such an electrolyte which can be used without subjecting an etching-treated aluminum foil to any other treatment in which a capability of forming a complex to aluminum is prevented.

Yet another object of the invention is to provide such an electrolyte which can be used of a long period of time without causing deterioration of an oxide layer of a dielectric of the electrode foil at the anode.

DESCRIPTION OF THE PREFERRED EMBODIMENTS

The present invention is characterized by at least one of long chain dibasic acid having 12 to 22 carbon atoms and having an alkyl group at the side chain thereof or salts thereof as a main solute is dissolved in a solvent mainly composed of ethylene glycol, and at least one compound selected from the group consisting of polycarboxylic acids, inorganic acids consisting of phosphoric acid and sulfuric acid, 8-oxyquinoline and ethylenediamine tetraacetic acid (or salts thereof) is added to and dissolved in the resulting solution. By adding a compound selected from the group consisting of polycarboxylic acids, inorganic acids, 8-oxyquinoline and ethylenediamine tetraacetic acid (or salts thereof), the formation of a complex of the long chain dibasic acids and aluminum at the surface of the cathode is prevented. This prevents a decrease in electric capacity due to reduction of surface area of the electrode foil at the cathode. At the same time, it is contemplated to provide electrolytic capacitors having small equivalent series resistance and low impedance characteristics due to low specific resistance which is characteristic of a long chain dibasic acids having an alkyl group at the side thereof.

The polycarboxylic acids, inorganic acids, 8-oxyquinoline and ethylenediamine tetraacetic acid (or salts thereof) which are added in the present invention act so as to protect etching pits formed on the electrode foil at the cathode and maintain the function of enlarging the foil surface of such etching pits. In other words, it is believed that additives such as the polycarboxylic acids or the like would prevent the formation of the long chain dibasic acid complex or prevent the formation of complex which causes short circuit in etching pits since they cover the surface of the electrode foil at the cathode to mask the active site thereof and at the same time, change the pH of the solution around the surface thereof. It is known that the complex formation is strongly dependent on the kind of solvent or the pH of the solution.

Long chain dibasic acids containing an alkyl group at the side chain thereof which are employed in the present invention contain 12 to 22 carbon atoms, preferably 12 to 16; the carbon atom number of the alkyl group constituting the side chain thereof is from 1 to 17, preferably 1 to 6. Specific examples of the alkyl group include a methyl group, an ethyl group, a butyl group, etc. Specific examples of the long chain dibasic acids containing an alkyl group at the side chain thereof include 1,6-decanedicarboxylic acid, 6-ethyl-1,12-dodecanedicarboxylic acid, 6-ethylene-1,12-dodecanedicarboxylic acid, 7-methyl-7-octadecene-1,14-dicarboxylic acid, 7-methyl-1,14-octadecanedicarboxylic acid, 6-ethyl-1,16-hexadecanedicarboxylic acid, 6-ethylene-9-hexadecene-1,16-dicarboxylic acid, 7,12-dimethyl-7,11-octadecadiene1,18-dicarboxylic acid, 7,12-dimethyl-1,18-octadecanedicarboxylic acid, etc. Preferred dibasic acids include 1,6-decanedicarboxylic acid and 6-ethyl-1,12-dodecanedicarboxylic acid. Preferred salts of these dibasic acids include ammonium salt, amine salt, sodium salt and potassium salt.

Preferred polycarboxylic acids to be added to the electrolyte of the present invention include maleic acid, fumaric acid, methylmaleic acid, methylfumaric acid, itaconic acid, glutaconic acid, 1,2,3,4-butanetetracarboxylic acid and diglycol acid.

Inorganic acids preferably added in the present invention include phosphoric acid and sulfuric acid. Preferred examples of ethylenediamine tetraacetates include sodium salts and potassium salts.

The agent for preventing the formation of the aluminum complex in the present invention is selected from at least one of polycarboxylic acids, inorganic acids, 8-oxyquinoline and ethylenediamine tetraacetic acid (or salts thereof), etc. The addition amount is in the ranges of 0.01 to 3 wt %, preferably 0.1 to 1 wt %. In case that the aforesaid agent is employed as a mixture of two or more, the total amount is 2 wt % or less.

The amount of ethylene glycol employed is in the range of 70 to 90 wt %, preferably 75 to 80 wt %. The long chain dibasic acids containing an alkyl group at the side chain thereof are employed in an amount of 8 to 30 wt %, preferably 10 to 17 wt %.

The electrolyte of the present invention may contain other additives such as p-nitrobenzoic acid, p-nitrophenol, m-nitrophenol, boric acid, etc., if necessary and desired, in an amount of 0.01 to 10 wt %, preferably 0.1 to 5 wt %.

Hereafter the present invention will be explained in more detail with reference to the examples below. In the examples, an electrolyte obtained by dissolving a long chain dibasic acid having 12 to 22 carbon atoms in total and containing an alkyl group at the side chain thereof as a solute in a solvent mainly composed of ethylene glycol and further adding at least one of polycarboxylic acids, inorganic acids, 8-oxyquinoline and ethylenediamine tetraacetic acid (or salts thereof) to the solution and an additive(s) was employed. In order to verify the effect of the additive(s), an ethylene glycol-boric acid type electrolyte and an electrolyte using as main solutes long chain dibasic acid containing an alkyl group at the side chain thereof to which no additive was added are shown as Comparative Examples 1, 2 and 3. In these comparative examples and the examples of the present invention, composition of electrolyte (wt %) and specific resistance Rs ($\Omega$cm/30° C.), withstand voltage Vs (V) and water content $H_2O$ (%) at 30° C. in the respective cases are shown below.

COMPARATIVE EXAMPLE 1

Ethylene glycol: 67 wt %
Boric acid: 16.5 wt %
Ammonium borate: 16.5 wt %
Rs: 1,000 Ω cm, Vs: 400 V, $H_2O$: 26%

COMPARATIVE EXAMPLE 2

Ethylene glycol: 90 wt %
Ammonium adipate: 10 wt %
Rs: 300 Ω cm, Vs: 100 V, $H_2O$: 0.5%

COMPARATIVE EXAMPLE 3

Ethylene glycol: 80 wt %
1,6-Decanedicarboxylic acid: 18 wt %
Ammonia: 2 wt %
Rs: 430 Ω cm, Vs: 420 V, $H_2O$: 0.7%

EXAMPLE 1

Ethylene glycol: 79.8 wt %
1,6-Decanedicarboxylic acid: 18 wt %
Ammonia: 2 wt %
Maleic acid: 0.2 wt %
Rs: 420 Ω cm, Vs: 420 V, $H_2O$: 0.7%

EXAMPLE 2

Ethylene glycol: 79.8 wt %
1,6-Decanedicarboxylic acid: 18 wt %
Ammonia: 2 wt %
Fumaric acid: 0.2 wt %
Rs: 430 Ω cm, Vs: 420 V, $H_2O$: 0.8%

EXAMPLE 3

Ethylene glycol: 79.8 wt %
1,6-Decanedicarboxylic acid: 18 wt %
Ammonia: 2 wt %
Methylmaleic acid: 0.2 wt %
Rs: 450 Ω cm, Vs: 420 V, $H_2O$: 0.6%

EXAMPLE 4

Ethylene glycol: 79.8 wt %
1,6-Decanedicarboxylic acid: 18 wt %
Ammonia: 2 wt %
Methylfumaric acid: 0.2 wt %
Rs: 450 Ω cm, Vs: 430 V, $H_2O$: 0.5%

EXAMPLE 5

Ethylene glycol: 79.8 wt %
1,6-Decanedicarboxylic acid: 18 wt %
Ammonia: 2 wt %
Itaconic acid: 0.2 wt %
Rs: 440 Ω cm, Vs: 410 V, $H_2O$: 0.8%

EXAMPLE 6

Ethylene glycol: 79.8 wt %
1,6-Decanedicarboxylic acid: 18 wt %
Ammonia: 2 wt %
Glutaconic acid: 0.2 wt %
Rs: 450 Ω cm, Vs: 420 V, $H_2O$: 0.6%

EXAMPLE 7

Ethylene glycol: 79.8 wt %
6-Ethyl-1,12-dodecanedicarboxylic acid: 18 wt %
Ammonia: 2 wt %
Rs: 400 Ω cm, Vs: 440 V, $H_2O$: 0.7%

EXAMPLE 8

Ethylene glycol: 79.8 wt %
7,12-Dimethyl-1,18-octadecanedicarboxylic acid: 18 wt %
Ammonia: 2 wt %
Maleic acid: 0.2 wt %
Rs: 470 Ω cm, Vs: 440 V, $H_2O$: 0.5%

EXAMPLE 9

Ethylene glycol: 79.8 wt %
7,12-Dimethyl-1,18-octadecanedicarboxylic acid: 18 wt %
Ammonia: 2 wt %
1,2,3,4-Butanetetracarboxylic acid: 0.2 wt %
Rs: 470 Ω cm, Vs: 440 V, $H_2O$: 0.5%

EXAMPLE 10

Ethylene glycol: 79.8 wt %
7,12-Dimethyl-1,18-octadecanedicarboxylic acid: 18 wt %
Ammonia: 2 wt %
Diglycolic acid: 0.2 wt %
Rs: 470 Ω cm, Vs: 440 V, $H_2O$: 0.5%

EXAMPLE 11

Ethylene glycol: 79.9 wt %
1,6-Decanedicarboxylic acid: 18 wt %
Ammonia: 2 wt %
Phosphoric acid: 0.1 wt %
Rs: 400 Ω cm, Vs: 410 V, $H_2O$: 0.6%

EXAMPLE 12

Ethylene glycol: 79.9 wt %
1,6-Decanedicarboxylic acid: 18 wt %
Ammonia: 2 wt %
Sulfuric acid: 0.1 wt %
Rs: 400 Ω cm, Vs: 400 V, $H_2O$: 0.5%

EXAMPLE 13

Ethylene glycol: 79.5 wt %
1,6-Decanedicarboxylic acid: 18 wt %
Ammonia: 2 wt %
8-Oxyquinoline: 0.5 wt %
Rs: 430 Ω cm, Vs: 420 V, $H_2O$: 0.6%

EXAMPLE 14

Ethylene glycol: 79.5 wt %
1,6-Decanedicarboxylic acid: 18 wt %
Ammonia: 2 wt %
Ethylenediamine tetraacetic acid: 0.5 wt %
Rs: 440 Ω cm, Vs: 420 V, $H_2O$: 0.7%

As described above, it is understood that the electrolyte in each of the examples has low specific resistance and less water content than that of Comparative Example 1. More specifically, even when a polycarboxylic acid is added, the characteristics of the electrolyte obtained using the long chain dibasic acid containing an alkyl group at the side chain thereof as a solute are not damaged but maintained, as in Comparative Examples 2 and 3.

Next, life characteristics of an electrolytic capacitor using the electrolyte in accordance with the present invention will be explained. The electrolytic capacitor used in the experiments is provided with electrodes at cathode and anode formed with an aluminum foil having high purity. Each of the electrode foils is subjected to a treatment for enlarging surface area by etching. Further the surface of the electrode foil at the anode is cathodically oxidized at a voltage of 690 (V) to form an oxidized layer of a dielectric thereon. The electrolytic capacitor element is formed by laminating the electrode foils at the cathode and anode via separating paper therebetween and winding. An immersion treatment of the electrolytic capacitor element with the electrolyte is carried out by separately immersing the element in each of the electrolytes provided for test after allowing them to stand in atmosphere of 20 (°C.) and humidity of 100 (%). The electrolytic capacitor element was sealed in an aluminum made-armoring case in a conventional manner to make it an electrolytic capacitor for carrying out a test. The electrolytic capacitor has a rated voltage of 400 (V) and a rated capacitance of 100 ($\mu$F). With the electrolytic capacitor, a load life test was performed by applying a rated voltage of 400 (V) at high temperature of 110 (°C.), whereby its initial characteristics, i.e., capacitance cap ($\mu$F), dielectric loss than $\delta$ and leak current LC ($\mu$F), were measured and characteristics after the lapse of 1000 hours were likewise measured. In this experiment, the electrolyte shown in Comparative Example 3 using as a main solute a long chain dibasic acid containing an alkyl group at the side chain thereof, to which no polycarboxylic acid was added, and the electrolytes shown in Examples 1, 2 and 8 were used.

The results of the experiment are shown in the table below.

TABLE

| Run No. | Initial Characteristic Value | | | Value After Lapse of Time for 1,000 hours | | | Abnormality in Appearance |
|---|---|---|---|---|---|---|---|
| | cap $\mu$F | tan $\delta$ | LC $\mu$A | cap $\mu$F | tan $\delta$ | LC $\mu$A | |
| Comparative Example 3 | 110 | 0.040 | 48 | 92 | 0.049 | 22 | none |
| Example 1 | 111 | 0.039 | 49 | 110 | 0.042 | 19 | none |
| Example 2 | 109 | 0.039 | 45 | 110 | 0.042 | 21 | none |
| Example 8 | 109 | 0.039 | 50 | 108 | 0.045 | 18 | none |
| Example 11 | 113 | 0.038 | 55 | 109 | 0.041 | 30 | none |
| Example 12 | 112 | 0.037 | 52 | 111 | 0.039 | 18 | none |
| Example 13 | 110 | 0.038 | 50 | 110 | 0.040 | 20 | none |
| Example 14 | 109 | 0.040 | 43 | 110 | 0.042 | 25 | none |

In the results of the experiment, each of the electrolytes showed almost the same values in initial characteristics. However, after the lapse of 1000 hours, there was no change of capacitance in Examples 1, 2, 11, 12, 13 and 14, and the increase in dielectric loss is less, as compared to Comparative Example 3. That is, a long chain dibasic acid is used as a main solute in all of the examples and comparative example, but it is believed that in the examples, the complex formation by the long chain dibasic acid would be prevented by the polycarboxylic acid and as a result, a decrease of capacitance would be prevented. In other words, the polycarboxylic acid added to the electrolyte covers the surface of the electrode foil at the cathode to mask its active site and at the same time, changes the pH around the surface of the electrode foil at the cathode to thereby reduce the capability to form a complex of the long chain dibasic acid in the electrolyte. Accordingly, the electrolytic capacitor having a stable capacitance can be formed by adding such a polycarboxylic acid using an etching-treated aluminum foil as a cathode as it is, without forming a complex even when water is absorbed during the assembly line of products.

Further, characteristics of the electrolytes obtained using as a solute at least one of the long chain dibasic acid containing an alkyl group at the side chain thereof and salts thereof are maintained and promoted and further electrolytes having a low dielectric loss and a small specific resistance, by the addition of the polycarboxylic acid, phosphoric acid, sulfuric acid, 8- oxyquinoline and 1,6-decanedicarboxylic acid, because the increment of the dielectric loss is small in Examples 1, 2, 8, 11, 12, 13 and 14. Accordingly, electrolytic capacitors having a small equivalent series resistance and low impedance characteristics can be formed using such electrolytes. As is well known, impedance characteristics of an electrolytic capacitor are greatly affected by equivalent series resistance in impedance at a high frequency region of 10 to 30 KHz approximate to resonant frequency; if the value of equivalent series resistance is reduced, the impedance in the high frequency can be lowered. Therefore, electrolytic capacitors having low impedance characteristics against a high frequency by reducing equivalent series resistance and having high withstand voltage can be formed using such electrolytes. Thus, such electrolytic capacitors having excellent electric properties greatly contribute to improvement of frequency characteristics in various electronic equipments, and are particularly suited as smoothing electrolytic capacitors of switching regulators having high switching frequency.

Further, no abnormality in appearance was noted even in use at high temperature of 110° C. This is because the characteristic feature exhibited by the use of the long chain dibasic acid as a main solute is maintained. That is, generation of water vapor is prevented by reducing the water content in the electrolytes. Accordingly, when such electrolytes are employed, stable electric properties can be maintained and excellent life characteristics can be obtained, at high temperatures exceeding 100° C. Further, deterioration of an oxidized layer of a dielectric of the electrode foil at anode which was caused by conventional ethylene glycol-boric acid type electrolytes can also be prevented.

Similar effects can be obtained with the use of at least one long chain dibasic acid containing an alkyl group at the side chain thereof or salts thereof as a main solute(s) not shown in the examples in the electrolyte of the present invention, let alone with the solutes shown in the respective examples. For example, any of dibasic acids which are not shown in the examples, e.g., 6-ethylene-1,12-dodecanedicarboxylic acid, 7-methyl-7-octadecene-1,14-dicarboxylic acid, 7-methyl-7-octadecene-1,14-dicarboxylic acid, 6-ethyl-1,16-hexadecanedicarboxylic acid, 6-ethylene-1,16-hexadecene-1,16-dicarboxylic acid, or 7,12-dimethyl- 7,11-octadecadiene-1,18-dicarboxylic acid, can be employed.

As described above, the capability of forming the long chain dibasic acid complex to aluminum can be prevented according to the present invention and an etching-treated aluminum foil can be employed as it is without subjecting aluminum to other treatment. At the same time, the electrolyte of the present invention shows a small specific resistivity and a minimized water content so that not only the temperature range under condition for use can be broadened, in particular, the upper limit of the temperature range can be raised, with a small loss, but also there is no abnormal increase in the inner pressure of armoring cases due to generation of water vapor at high temperature and there is no deterioration of an oxidized layer of a dielectric of the electrode foil at the anode.

While the invention has been described in detail and with reference to specific embodiments thereof, it will be apparent to one skilled in the art that various changes and modifications can be made therein without departing from the spirit and scope thereof.

What is claimed is:

1. An electrolyte for an electrolytic capacitor, comprising:
   a main solute comprised of a long chain dibasic acid with 12 to 22 carbon atoms and an alkyl group at the side chain thereof or a salt thereof;
   the solute being dissolved in a solvent comprised of ethylene glycol; and
   an additional solute dissolved in the solvent, the additional solute being selected from the group consisting of (1) a polycarboxylic acid, (2) an inorganic acid selected from the group consisting of phosphoric acid and sulfuric acid, (3) 8-oxyquinoline and (4) ethylenediamine tetraacetic acid or a salt thereof.

2. The electrolyte for an electrolytic capacitor as claimed in claim 1, wherein said long chain dibasic acid is selected from the group consisting of 1,6-decanedicarboxylic acid, 6-ethyl-1,12-dodecanedicarboxylic acid, 6-ethylene-1,12-dodecanedicarboxylic acid, 7-methyl-7-octadecene-1,14-dicarboxylic acid, 7-methyl-1,14-octadecanedicarboxylic acid, 6-ethyl-1,16-hexadecanedicarboxylic acid, 6-ethylene-9-hexadecene-1,16-dicarboxylic acid, 7,12-dimethyl-7,11-octadecadiene-1,18-dicarboxylic acid and 7,12-dimethyl-1,18-octadecanedicarboxylic acid.

3. An electrolyte for an electrolytic capacitor as claimed in claim 1, wherein the long chain dibasic acid is selected from the group consisting of 1,6-decanedicarboxylic acid and 6-ethyl-1,12-dodecanedicarboxylic acid.

4. An electrolyte for an electrolytic capacitor as claimed in claim 1, wherein the additional solute is a polycarboxylic acid selected from the group consisting of maleic acid, fumaric acid, methylmaleic acid, methylfumaric acid, itaconic acid, glutaconic acid, 1, 2, 3, 4-butanetetracarboxylic acid and diglycol acid.

* * * * *